US012574323B2

(12) United States Patent
Loriol et al.

(10) Patent No.: US 12,574,323 B2
(45) Date of Patent: Mar. 10, 2026

(54) FILTERING VPN AND VRF ROUTES ON IMPORT AND EXPORT

(71) Applicant: Arista Networks, Inc., Santa Clara, CA (US)

(72) Inventors: Matthieu Loriol, Vancouver (CA); Sharad Birmiwal, Vancouver (CA); Darragh Dunne, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 290 days.

(21) Appl. No.: 18/309,033

(22) Filed: Apr. 28, 2023

(65) Prior Publication Data

US 2024/0267328 A1 Aug. 8, 2024

Related U.S. Application Data

(60) Provisional application No. 63/483,245, filed on Feb. 3, 2023.

(51) Int. Cl.
*H04L 45/745* (2022.01)
*H04L 12/46* (2006.01)
*H04L 45/586* (2022.01)

(52) U.S. Cl.
CPC ........ *H04L 45/745* (2013.01); *H04L 12/4641* (2013.01); *H04L 45/586* (2013.01)

(58) Field of Classification Search
None
See application file for complete search history.

(56) References Cited

U.S. PATENT DOCUMENTS

| | | | | |
|---|---|---|---|---|
| 2005/0188106 A1* | 8/2005 | Pirbhai | ................... | H04L 45/54 |
| | | | | 709/238 |
| 2010/0111093 A1* | 5/2010 | Satterlee | ............... | H04L 65/611 |
| | | | | 370/401 |
| 2021/0377167 A1* | 12/2021 | Tamizkar | .............. | H04L 45/586 |

FOREIGN PATENT DOCUMENTS

| | | | | | |
|---|---|---|---|---|---|
| CN | 113016167 B | * | 9/2023 | ......... | H04L 63/1408 |
| WO | WO-2020098611 A1 | * | 5/2020 | ............. | H04L 12/46 |

OTHER PUBLICATIONS

Author Unknown, Re-advertise direct leaked routes to other routers in VRF, pp. 1-12, Aug. 26 (Year: 2021).*
Author Unknown, Configuring Junos OS Routing Tables, pp. 1-19, as retrieved from Internet Archive, www.archive.org, Apr. 14 (Year: 2021).*
Author Unknown, Juniper Route Leaking, pp. 1-7, Mar. 14 (Year: 2014).*

(Continued)

*Primary Examiner* — Christopher M Crutchfield
(74) *Attorney, Agent, or Firm* — Fountainhead Law Group, PC

(57) ABSTRACT

User commands to export and import routes between a customer-facing VRF and a core-facing VRF in a PE device can include two filters. An export command installs VPN paths in the core-facing VRF based on VRF paths in a customer VRF. An export command includes a filter that selects VRF paths in the customer VRF from which VPN paths are generated. An editor function edits the generated VPN paths prior to being stored in the core-facing VRF. Conversely, an import command includes a filter that selects VPN paths in the core-facing VRF from which VRF paths are generated. An edit function edits the generated VRF paths prior to being stored in the customer VRF.

14 Claims, 5 Drawing Sheets

(56)          References Cited

OTHER PUBLICATIONS

Author Unknown, Understanding the Auto Export Feature, pp. 102, Jul. 19 (Year: 2011).*
Author Unknown, Extreme SLE-OS Layer 3 Routing Configuration Guide, pp. 1-4, Mar. (Year: 2021).*

* cited by examiner

FILTERING VPN AND VRF ROUTES ON IMPORT AND EXPORT

CROSS REFERENCE TO RELATED APPLICATIONS

Pursuant to 35 U.S.C. § 119(e), this application is entitled to and claims the benefit of the filing date of U.S. Provisional App. No. 63/483,245 filed Feb. 3, 2023, the content of which is incorporated herein by reference in its entirety for all purposes.

BACKGROUND

Virtual routing and forwarding (VRF) is a network technology that enables multiple instances of routing and forwarding tables to exist independently of each other in a router. VRFs act as logical routers. VRFs can support multiple different internet protocol (IP) domains in one physical router without crossing traffic from the different domains. In an internet service provider (ISP) deployment, for example, a provider edge (PE) router can run/instantiate a VRF for each of its customers (customer-side or customer VRFs), allowing each customer to define the same subnet(s) independently of any other customer. The PE router can run a provider-side VRF to carry traffic between the customer-side VRFs and the ISP's core network.

Management of the PE router includes exporting routes from the customer-side VRFs to populate the PE VRF so that the PE VRF knows how to encapsulate packets with metadata that identify each customer's packets. Conversely, routes from the PE VRF can be imported into respective customer-side VRFs, allowing customer-side VRFs within a given domain to know about each other.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
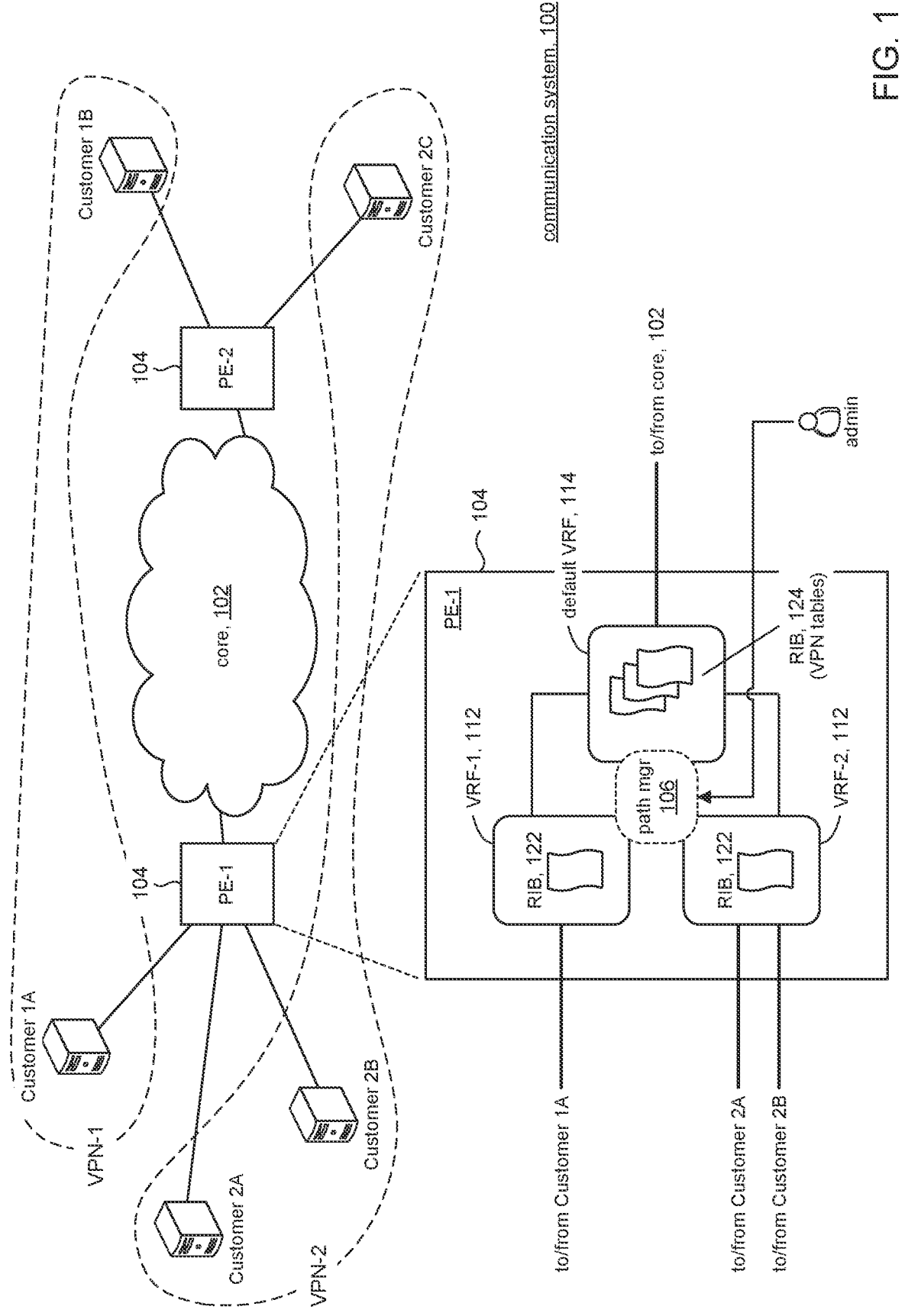
FIG. 1 illustrates an example of network deployment that can be adapted in accordance with the present disclosure.

FIG. 1 is a high level diagram illustrating a network communication system 100 that can embody the techniques in accordance with the present disclosure. Communication system 100 can comprise a core network 102 and provider edge (PE) devices 104. Users connect to the communication system via the PE devices. FIG. 1, for example, shows users connected to PE-1 and PE-2. Although only two PE devices are illustrated, it will be appreciated that core network 102 can have additional PE devices. PE devices 104 can be configured to define virtual private networks (VPNs) for users on the communication system. Merely to illustrate, an internet service provider (ISP) may provide VPN services to support communication among different groups of customers connected to the ISP's network. The ISP may define a VPN (VPN-1) for customers 1A and 1B, and a separate VPN2 for customers 2A, 2B, and 2C. Customers in a VPN that are on the same side of a PE (e.g., customers 2A, 2B are connected to the same PE) can communicate via the PE without communicating over the core 102. Transmissions between customers in a VPN, who are connected on different PEs, are transported across the core 102; e.g., customers 1A and 1B are on different PEs, customers 2A and 2C are on different PEs. The core 102 can be based on any suitable switching technology, such as multi-protocol label switching (MPLS), and the like.

FIG. 1 shows details of a PE device 104 in accordance with some embodiments of the present disclosure. PE-1, for instance, can instantiate virtual router functionality 112, sometimes referred to as virtual routing and forwarding (VRF), to support a segmented network in a single physical device. A customer-side VRF 112 (referred to herein as a customer VRF) can be instantiated for each VPN defined in PE-1 to support customers in that VPN. As shown in FIG. 1, for example, on the customer side, PE-1 can instantiate VRF-1 to provide communication for customers in VPN-1 who are connected to PE-1. Likewise, VRF-2 can be instantiated to provide communication for customers in VPN-2 who are connected to PE-1, and so on. On the core side, a VRF 114 (referred to herein as the default VRF) can provide communication across the core 102 with other PEs connected to the core. Although FIG. 1 shows only one other PE on the core, it will be understood that other deployments can include additional PEs on the core that exchange routing information with each other and carry traffic across the core.

Continuing with the detail of PE-1 shown in FIG. 1, each customer VRF 112 can include a routing information base (RIB) 122 to support the routing of packets among customers in a VPN. The RIB 122 in a customer VRF 112 can include tables such as a routing table; typically, the customer VRF comprises just one routing table. Routes (also referred to as paths) in the customer VRFs 112 can be referred to as VRF routes or Unicast routes.

Likewise, the RIB 124 in the default VRF 114 can comprise a plurality of routing tables to support different kinds of routes. For example, RIB 124 may include a routing table for IPv4 routes, another routing table for IPv6 routes, and so on. The routing tables in the default VRF can be referred to as VPN tables to highlight the fact that these tables store information to carry information for multiple VRFs within a single AFI/SAFI (address family identifier/subsequent address family identifier) and a single BGP (border gateway protocol) session with another PE (peer).

Routes in the default VRF can be routes that support VPN communication among the PEs 104; these routes can be referred to as VPN paths to distinguish from customer VRF paths. A VPN path provides a kind of multiplexing whereby the default VRF can advertise routing information for different customers without ambiguity.

PE device 104 can include a path manager 106 to manage routes between customer VRFs 112 and the VPN tables in the default VRF 114 in accordance with the present disclosure. The management of routes between VRFs includes exchanging routes between customer VRFs and the default VRF. The default VRF can be populated with routes in the customer VRFs and, vice versa, the customer VRFs can be populated with respective routes in the default VRF. As used herein, the terms "import" and "export" are used with respect to the customer VRF. Routes can be imported into a customer VRF from one of the VPN tables in the default VRF. Conversely, routes can be exported from a customer VRF into a VPN table in the default VRF. The path manager 106 can include a suitable user interface (e.g., command line interface, CLI) to allow a user (e.g., a network administrator of the ISP) to import/export routes to/from a customer VRF, including specifying filters and editors.

Figure 2:
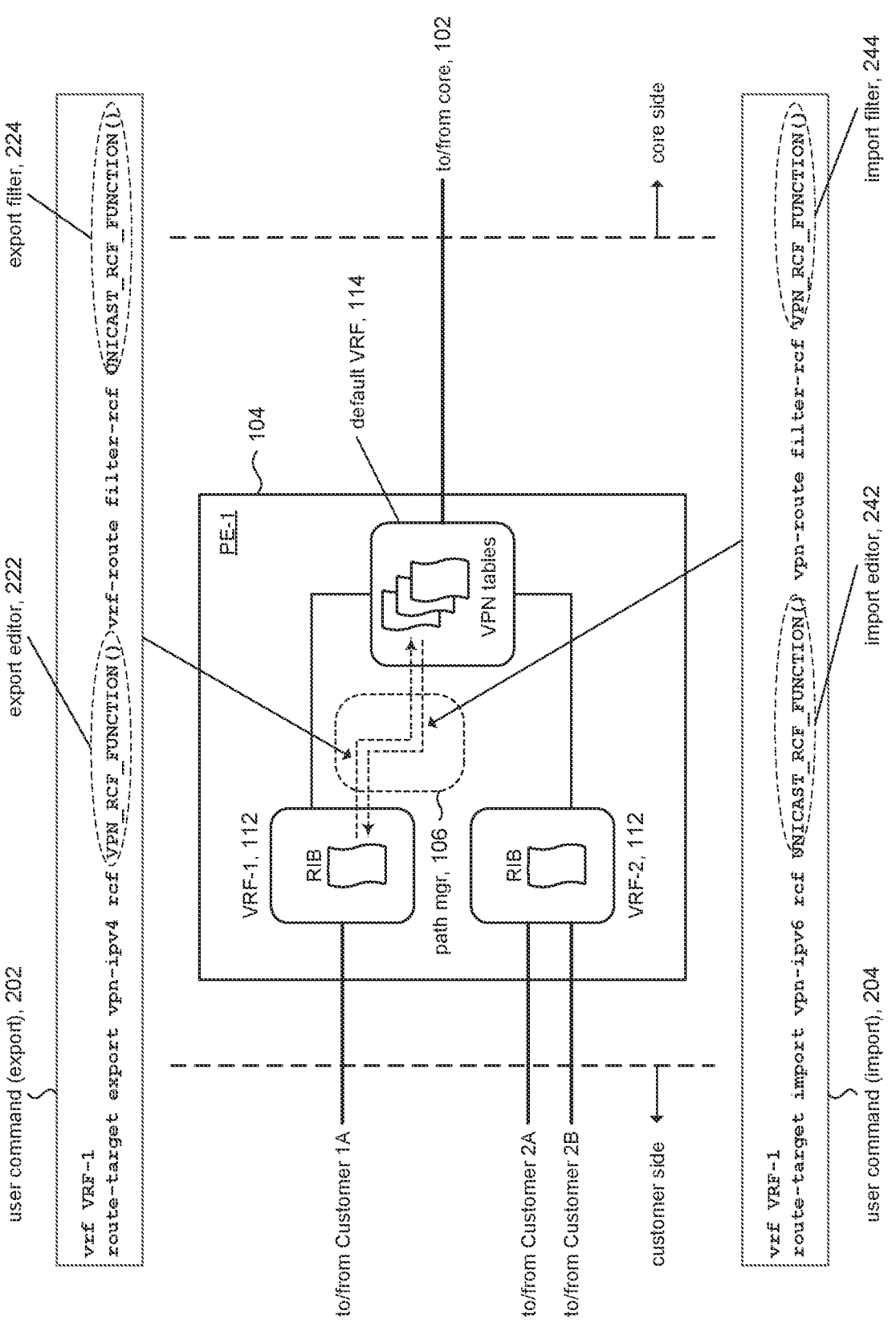
FIG. 2 illustrates some details for exchanging routes between VRFs in accordance with the present disclosure.

FIG. 2 shows an example of importing and exporting of routes between a customer VRF and a VPN table (e.g., in default VRF 114) in accordance with the present disclosure. Routes are "exported" from a customer VRF to populate a VPN table, and routes are "imported" to a customer VRF from a VPN table. Consider first, the export of routes from a customer VRF. FIG. 2 shows an illustrative example of a command sequence 202 for exporting routes from customer VRF-1 into a VPN table in accordance with some embodiments. The command:

vrf VRF-1 selects the customer VRF from which routes will be exported, which in this example is VRF-1. The export command:

route-target export vpn–ipv4 [add'l command parameters]

specifies the VPN table that will receive the routes, which in this example is vpn-ipv4. The export command specifies two additional parameters: export editor 222 (editor function) and export filter 224 (filter function). As will be explained below, the export filter 224 can provide initial filtering on paths from the customer VRF. The export editor 222 can include editing operations and additional filtering and to selectively edit the filtered routes before being stored in the specified VPN table, or to drop the filtered routes. In accordance with some embodiments, the export editor and export filter can be references to functions written in a programmatic language. As illustrated in FIG. 2, the export command can be provided (e.g., via a suitable CLI) to the path manager 106 to export routes from the routing table of VRF-1 to the specified VPN table (e.g., in the default VRF).

FIG. 2 shows an illustrative example of a command sequence 204 for importing routes stored in a VPN table (e.g., in default VRF 114) into customer VRF-1. As noted above, the command:

vrf VRF-1 selects the customer VRF VRF-1, which is the target into which routes will be imported. The import command:

route-target export vpn–ipv4 [add'l command parameters]

specifies the VPN table that is the source of the routes, which in this example is vpn-ipv6. The import command specifies two additional parameters: import editor 242 (editor function) and import filter 244 (filter function). As will be explained below, the import filter 244 can provide initial filtering on routes from the specified VPN table. The import editor 242 can include editing operations and additional filtering and to selectively edit the filtered routes imported into VRF-1, or to drop the filtered routes. In accordance with some embodiments, the import editor and import filter can be references to functions written in a programmatic language. As shown in FIG. 2, the import command can be provided to the path manager 106 to import routes from the specified VPN table into the routing table in VRF-1.

Figure 3:
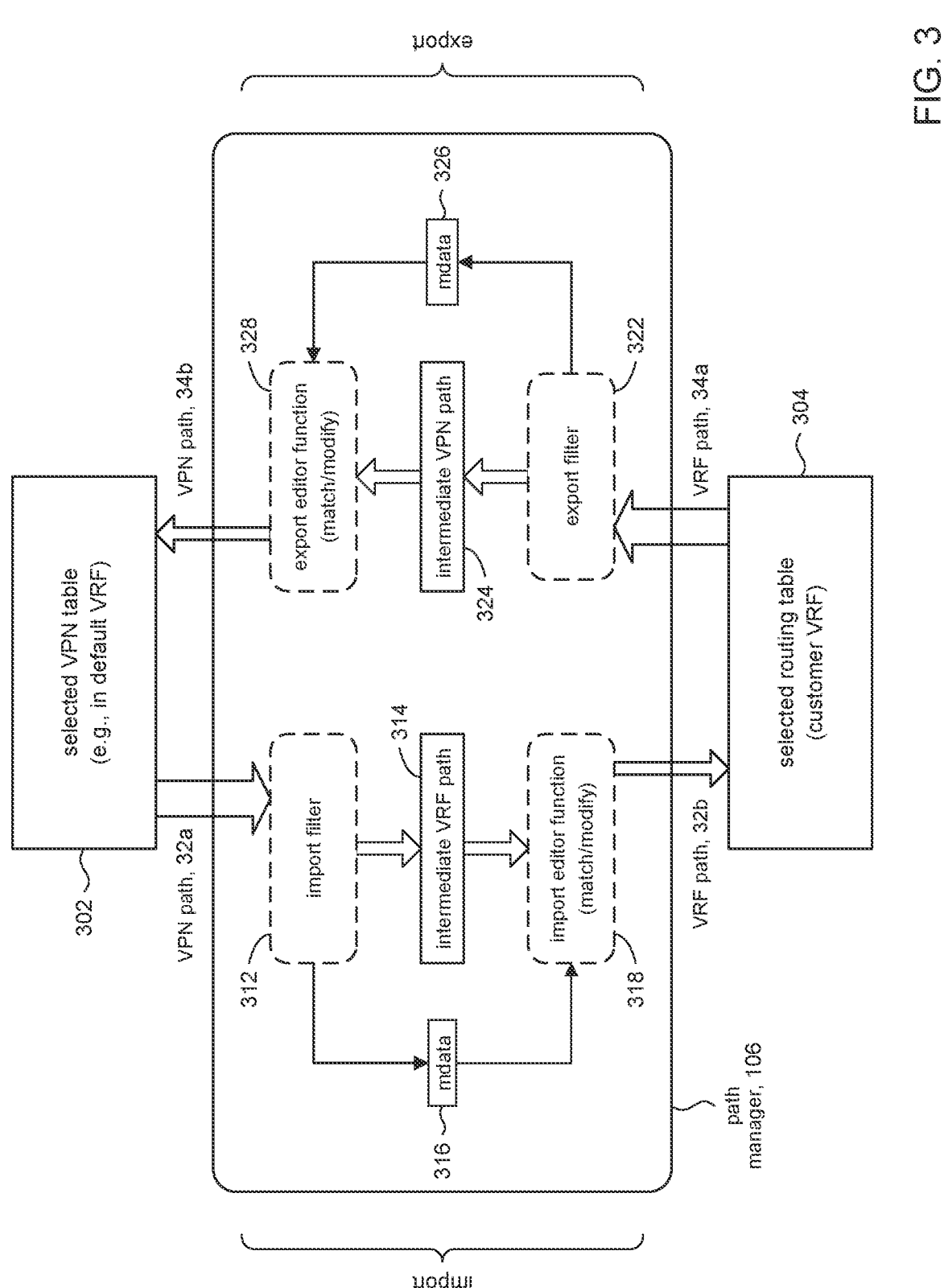
FIG. 3 illustrates some details for processing in the path manager in accordance with the present disclosure.

Referring to FIGS. 1 and 3, details of the import and export operations in accordance with some embodiments are shown.

Import Flow

Consider first the import of routes from a selected VPN table (e.g., vpn-ip4) in default VRF 114 to a selected customer VRF (e.g., VRF-1). Routes stored in the selected VPN table 302 can be referred to as VPN paths. Routes stored in the selected customer VRF 304 can be referred to either as VRF paths or Unicast routes.

The VPN paths can be filtered by import filter 312. In some embodiments, the import filter can be specified in the command line; see, for example, the import filter parameter 244 in the command line shown in FIG. 2. In accordance with the present disclosure, the import filter 312 can filter VPN paths based only on VPN attributes contained in the VPN paths.

As explained above, in some embodiments, the import filter 312 can be expressed programmatically in the form of a function, for example:

```
function IMPORT_FILTER( ) {
    if next_hop is 10.0.0.1 and local_preference is 100 {
        // continue to next stage
        return true;
    }
    if community has_any { 1:100, 1:200 } {
        // another reason to propagate it forward
        return true;
    }
    // don't consider it for the next stage, filter out
    return false;
}
```

This is an example of an import filter that comprises only VPN attributes; e.g., "local preference" and "community."

In some embodiments, the path manager 106 can invoke the import filter 312 for each VPN path 32a in the selected VPN table. Routes from the VPN table 302 that evaluate to FALSE in the import filter 312 can be filtered out from further processing and not be imported into the selected VRF 304. Routes that evaluate to TRUE can be further processed. The path manager can instantiate an intermediate VRF path 314 when the VPN path 32a evaluates to TRUE by the import filter; i.e., has not been filtered out. Following is an illustrative example of a VPN path from the VPN table 302:

BGP routing table information for VRF default
Router identifier 0.0.1.1, local AS number 1
BGP routing table entry for IPv4 prefix 123.0.0.0/24, Route Distinguisher: 1:1

-continued

```
Paths: 1 available
    101
        1.0.1.1 from 1.0.1.1 (1.0.0.1)
            Origin EGP, metric -, localpref 100, weight 0, tag 0, valid, external, best
            Extended Community: Route-Target-AS:0:101
            Remote MPLS label: 101
``` from which the following intermediate VRF path 314 can be instantiated:

```
BGP routing table information for VRF VRF_IMPORT
Router identifier 192.168.201.9, local AS number 1
BGP routing table entry for 123.0.0.0/24
    Paths: 1 available
        101
            1.0.1.1 from 1.0.1.1 (1.0.0.1), imported VPN-IPv4 route, RD 1:1
                Origin EGP, metric 0, localpref 100, IGP metric 0, weight 0, tag 0
                Received 00:34:51 ago, valid, external, best, AS Origin not validated
                Extended Community: Route-Target-AS:0:101
                Remote MPLS label: 101
                Rx SAFI : Unicast
```

The intermediate VRF path 314 can be modified and/or further filtered by import editor 318 before it is written to the routing table of the selected customer VRF 304. In some embodiments, the import editor can be specified in the command line; see, for example, the import editor parameter 242 in the command line shown in FIG. 2. As explained above, in some embodiments, the import editor 318 can be a function, for example:

```
function IMPORT_EDITOR( ) {
    if next_hop is 20.0.0.1 {
        return false; // reject the route/path
    }
    local_preference = 500;
    community add { 1:300, 1:400 };
    return true; // accept the route/path
}
```

The path manager 106 can invoke the import editor 318 for each instantiated intermediate VRF path 314 to produce a final VRF path 32b. The path manager 106 can store the final VRF path 32b into the routing table of the selected customer VRF 304. In some embodiments, for example, the import editor 318 may evaluate to TRUE or FALSE to inform the path manager whether to store the final VRF path 32b (e.g., TRUE condition) or drop (not store) the final VRF path (e.g., FALSE condition).

In some embodiments, metadata 316 can be generated by the import filter 312. The metadata 316 can be used further downstream to control how the intermediate VRF path 314 is processed. For example, the following code fragment may be part of the import filter:

```
if communities has { 10:100 } {
    // if this community is sent from the other PE, then ...
    tag = 5555;
}
``` where, TAG is the generated metadata 316. The downstream import editor 318 can use the TAG metadata to control its operations. For example, the following code fragment may be part of the import editor:

```
if tag is 5555 {
    // then do this special action on the imported route
    local_preference = 150;
}
```

Export Flow

FIG. 3 further shows the export of routes from a selected customer VRF to a selected VPN table, e.g., VPN-IPv4, in default VRF 114. Routes stored in the selected customer VRF 304 can be referred to either as VRF paths or Unicast routes. Routes stored in the selected VPN table 302 can be referred to as VPN paths.

The VRF paths can be filtered by export filter 322. In some embodiments, the export filter can be specified in the command line, for example, by the command line parameter export filter 224 in FIG. 2. The export filter 322 can filter out VRF paths based on attributes in the VRF paths. In accordance with the present disclosure, the export filter 322 can filter VRF paths based only on Unicast attributes contained in the VRF paths.

As explained above, in some embodiments, the export filter 322 can be expressed programmatically in the form of a function, for example:

```
function EXPORT_FILTER( ) {
    if local_preference is 250 {
        // continue to next stage
        return true;
    }
    if community has_any { 1:150, 1:250 } {
        // another reason to propagate it forward
        return true;
    }
    // don't consider it for the next stage, filter out
    return false;
}
```

This is an example of an export filter that comprises only VRF attributes.

In some embodiments, the path manager 106 can invoke the export filter 322 for each VRF path 34a in the selected customer VRF. Routes from the customer VRF 304 that evaluate to FALSE by the export filter 322 can be filtered out from further processing and will not populate the selected VPN table 302. Routes that evaluate to TRUE can be further processed. The path manager can instantiate an intermediate VPN path 324 when the VRF path 34*a* evaluates to TRUE by the export filter 322; i.e., has not been filtered out. Following is an illustrative example of a VRF path from the selected customer VRF 304:

```
BGP routing table information for VRF default
Router identifier 0.0.1.1, local AS number 1
BGP routing table entry for IPv4 prefix 123.0.0.0/24, Route Distinguisher: 1:1
  Paths: 1 available
    101
      1.0.1.1 from 1.0.1.1 (1.0.0.1)
        Origin EGP, metric -, localpref 100, weight 0, tag 0, valid, external, best
        Extended Community: Route-Target-AS:0:101
        Remote MPLS label: 101
``` from which the following intermediate VPN path 324 can be instantiated:

```
BGP routing table information for VRF VRF_IMPORT
Router identifier 192.168.201.9, local AS number 1
BGP routing table entry for 123.0.0.0/24
  Paths: 1 available
    101
      1.0.1.1 from 1.0.1.1 (1.0.0.1), imported VPN-IPv4 route, RD 1:1
        Origin EGP, metric 0, localpref 100, IGP metric 0, weight 0, tag 0
        Received 00:34:51 ago, valid, external, best, AS Origin not validated
        Extended Community: Route-Target-AS:0:101
        Remote MPLS label: 101
        Rx SAFI: Unicast
```

The intermediate VPN path 324 can be modified and/or further filtered by export editor 328 before it is written to the selected VPN table 302. In some embodiments, the export editor can be specified in the command line; see, for example, the export editor parameter 222 in the command line shown in FIG. 2. As explained above, in some embodiments, the export editor 328 can be a function, for example:

```
function EXPORT_EDITOR( ) {
    if next_hop is 20.0.0.1 {
        return false; // reject the route/path
    }
    local_preference = 500;
    community add { 1:300, 1:400 };
    return true; // accept the route/path
}
```

The path manager 106 can invoke the export editor 328 for each instantiated intermediate VPN path 324 to produce a final VPN path 34*b*. The path manager 106 can store the final VPN path 34*b* into the selected VPN table 302. In some embodiments, for example, the export editor 328 may evaluate to TRUE or FALSE to inform the path manager whether to store the final VPN path 34*b* (e.g., TRUE condition) or drop (not store) the final VPN path (e.g., FALSE condition).

In some embodiments, metadata 326 can be generated by the export filter 322. The metadata 326 can be used further downstream to control how the intermediate VPN path 324 is processed. For example, the following code fragment may be part of the export filter:

```
if communities has { 10:150 } {
    // if this community is present
    tag = 5555;
}
``` where, TAG is the generated metadata 326. The export editor 328 can use the TAG metadata to control its operations. For example, the following code fragment may be part of the export editor:

```
if tag is 5555 {
    // then do this special action on the exported route
    local_preference = 150;
}
```

Figure 4:
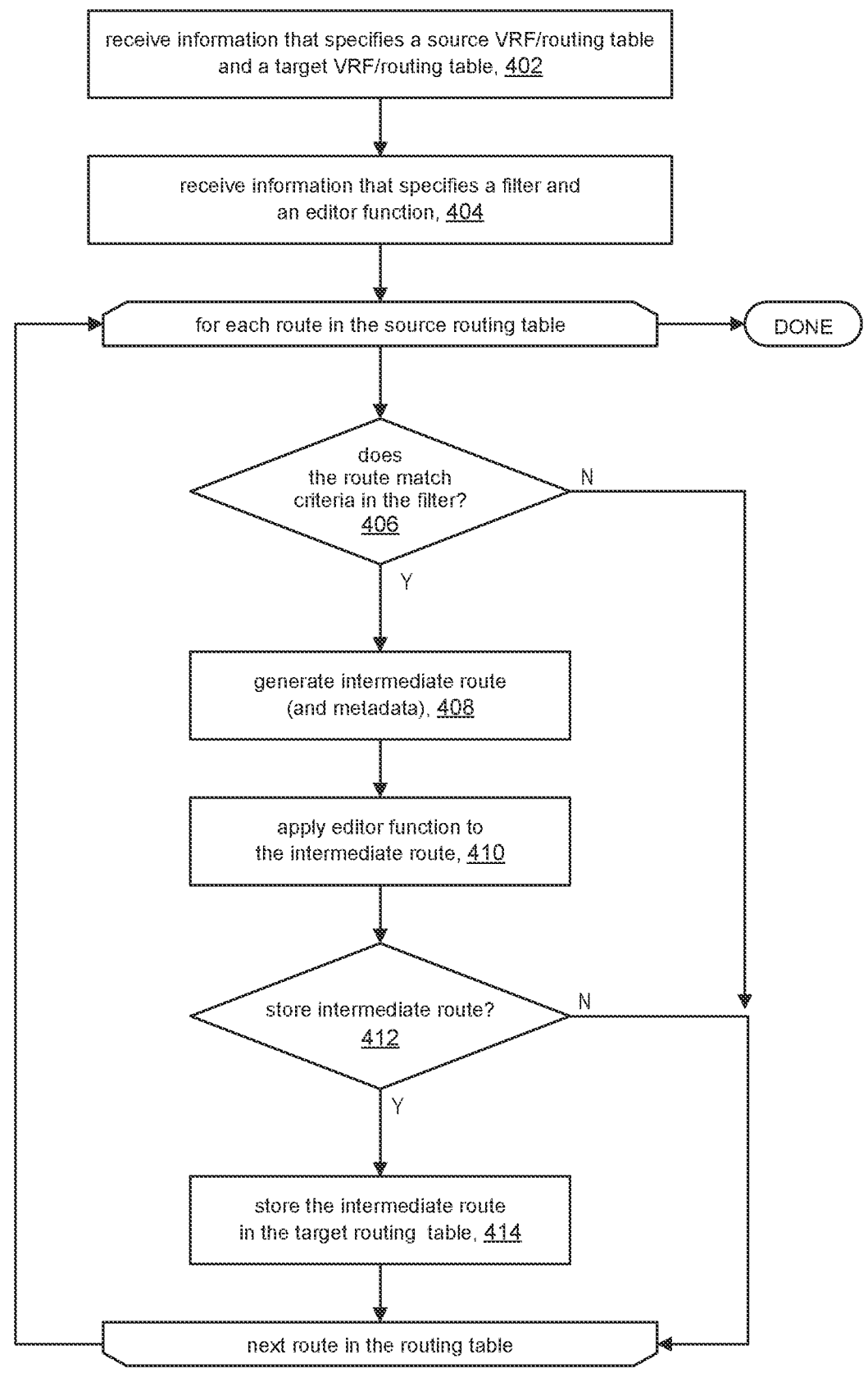
FIG. 4 illustrates representative operations in the path manager in accordance with the present disclosure.

Referring to FIG. 4, the discussion will now turn to a high-level description of processing in a network device (e.g., PE-1, FIG. 1) for managing routes between VRF instances in accordance with the present disclosure. Depending on implementation, the processing may be performed entirely in the control plane or entirely in the data plane, or the processing may be divided between the control plane and the data plane. In some embodiments, for example, the network device can include one or more processing units (circuits), which when operated, can cause the network device to perform processing in accordance with FIG. 4. Processing units (circuits) in the control plane can include general CPUs that operate by way of executing computer program code stored on a non-volatile computer readable storage medium (e.g., read-only memory); for example, CPU 508 in the control plane (FIG. 5) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of packet processors 512*a*-512*p* in the data plane (FIG. 5) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 402, the network device can receive information that specifies a source VRF and a target VRF, and respective source and target routing tables. In some embodiments, for example, the source/target VRFs and the source/target routing tables can be specified in a CLI command, such as illustrated in FIG. 2.

In the case of exporting routes, routes in the routing table of the customer-facing VRF are exported to populate one of the routing tables of the core network-facing VRF. The customer-facing VRF (e.g., customer VRF 112, FIG. 1) can be specified in the command and is the source VRF. The core network-facing VRF (e.g., default VRF 114, FIG. 1) can be specified in the command and is the target VRF. In some embodiments, where the customer VRF has one routing table, that one routing table can be the source routing table. The target routing table is one of many routing tables in the core network-facing VRF, and can be specified in the command.

In the case of importing routes, routes in one of the routing tables of the core network-facing VRF are imported into the routing table of the customer-facing VRF. The command can specify the core network-facing VRF as the source VRF, and one of the routing tables in the core network-facing VRF as the source routing table. The command can specify one of the customer-facing VRFs as the target VRF. In embodiments, where the customer VRF has one routing table, that one routing table can be the target routing table.

At operation 404, the network device can receive information that specifies a filter (e.g., 312, 322, FIG. 3) and an editor function (e.g., 318, 328). In some embodiments, the filter and editor function can be specified in a CLI command, such as illustrated in FIG. 2 for example. The filter can provide initial filtering on routes stored in the source table in the source VRF. As noted above, in accordance with the present disclosure, the filter can match on attributes contained in the type of routes that are stored in the source routing table. In the case of exporting routes, for instance, the routes in the routing table of the customer-facing VRF are Unicast routes, so the filter can filter on Unicast attributes. In the case of importing routes, the routes in the selected routing table of core network-facing VRF are VPN paths, so the filter can filter on VPN attributes.

The editor function can perform editing operations and in some instances additional filtering. The editor function can edit routes before being added to the target routing table. In some instances, the editor function can filter out routes.

In some embodiments, routes in the source routing table of the source VRF can be processed and stored into the target routing table of the target VRF, one route at a time. The following FOR loop illustrates the processing of each route in the source routing table. Processing can be deemed complete when each route in the source routing table has been processed as follows:

At decision point 406, if the route being processed matches criteria in the filter then processing can proceed to operation 408. If the route does not match any criteria in the filter then processing can return to the top of the FOR loop (operation 406) to process the next route in the source routing table. In some embodiments, the filter can be expressed programmatically; examples are provided above.

Accordingly, in some embodiments, if the filter program evaluates to TRUE, then processing can proceed to operation 408. If the filter program evaluates to FALSE, then processing can return to the top of the FOR loop to process the next route in the source routing table.

At operation 408, the network device can instantiate an intermediate route from the route being processed. In some embodiments, metadata (e.g., 316, 326) can be generated. In the case of exporting routes, the source routing table comprises Unicast routes and the instantiated route is a VPN route. In the case of importing routes, the source routing table comprises VPN routes and the instantiated route is a Unicast route.

At operation 410, the network device can apply or otherwise invoke the specified editor function on the intermediate route. In some embodiments, the editor function can include operations for modifying the intermediate route to produce a final route (e.g., 32b, 34b, FIG. 3) that is stored in the target routing table. In some embodiments, the editor function can include operations that use the metadata produced at operation 408 to control or otherwise affect generating the final route. In some embodiments, the editor function can include additional filtering (e.g., drop criteria) for filtering out or dropping the intermediate route; for example, if the intermediate route meets the drop criteria.

At decision point 412, if the editor function drops the intermediate route, then processing can return to the top of the FOR loop (operation 406) to process the next route in the source routing table. If the editor function has not dropped the intermediate route, then processing can proceed to operation 414.

At operation 414, the network device can store or populate the target routing table with the final route. Processing can return to the top of the FOR loop (operation 406) to process the next route in the source routing table.

Figure 5:
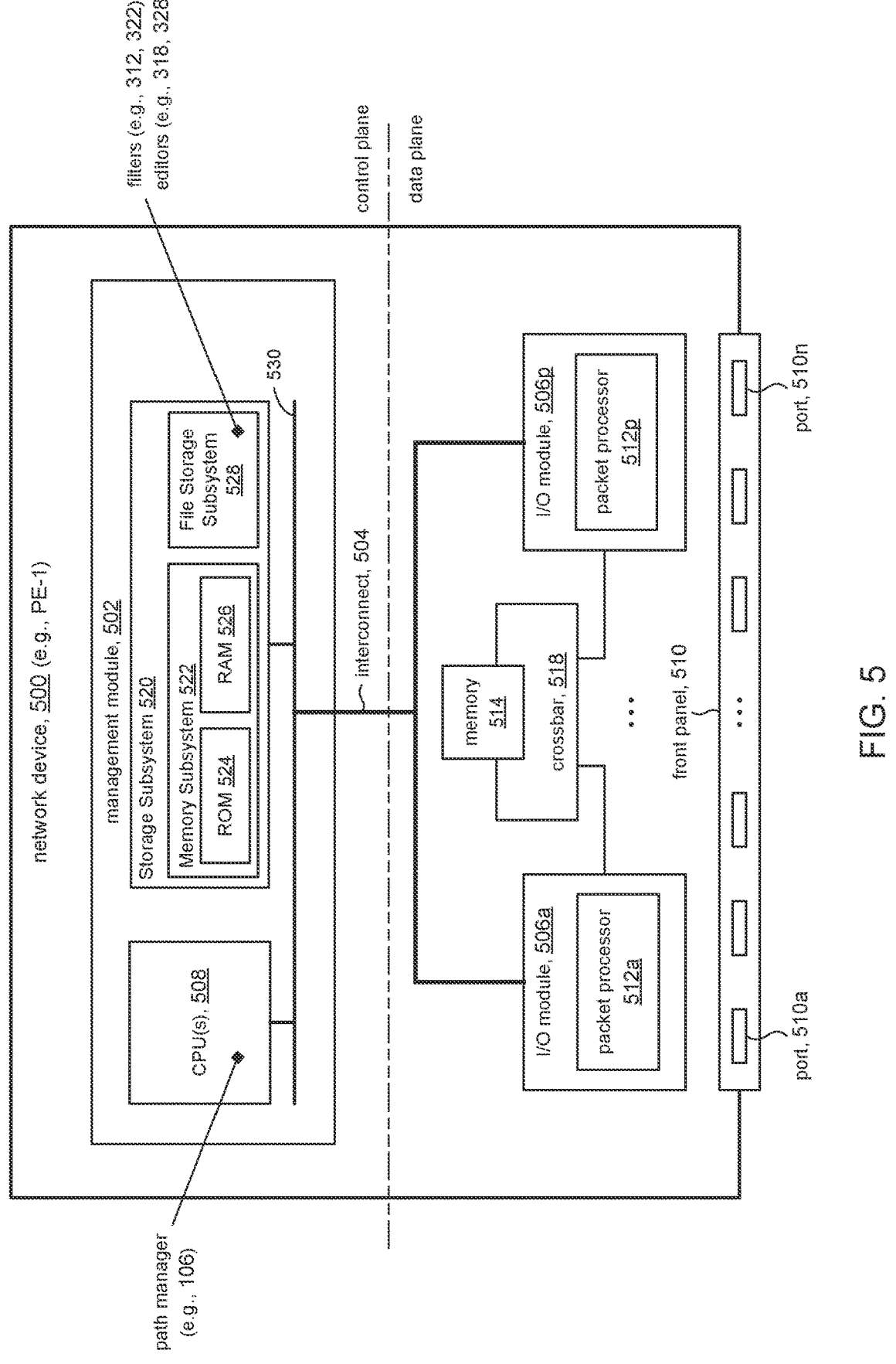
FIG. 5 illustrates some detail in a network device in accordance with the present disclosure.

FIG. 5 is a schematic representation of a network device 500 (e.g., PE-1, FIG. 1) that can be adapted in accordance with the present disclosure. In some embodiments, for example, network device 500 can include a management module 502, one or more I/O modules 506a-506p, and a front panel 510 of I/O ports (physical interfaces, I/Fs) 510a-510n. Management module 502 can constitute the control plane (also referred to as a control layer or simply the CPU) of network device 500 and can include one or more management CPUs 508 for managing and controlling operation of network device 500 in accordance with the present disclosure. Each management CPU 508 can be a general-purpose processor, such as an Intel®/AMD® x86, ARM® microprocessor and the like, that operates under the control of software stored in a memory device/chips such as ROM (read-only memory) 524 or RAM (random-access memory) 526. The control plane provides services that include traffic management functions such as routing, security, load balancing, analysis, and the like.

The one or more management CPUs 508 can communicate with storage subsystem 520 via bus subsystem 530. Other subsystems, such as a network interface subsystem (not shown in FIG. 5), may be on bus subsystem 530. Storage subsystem 520 can include memory subsystem 522 and file/disk storage subsystem 528. Memory subsystem 522 and file/disk storage subsystem 528 represent examples of non-transitory computer-readable storage devices that can store program code and/or data, which when executed by one or more management CPUs 508, can cause one or more management CPUs 508 to perform operations in accordance with embodiments of the present disclosure.

Memory subsystem 522 can include a number of memories such as main RAM 526 (e.g., static RAM, dynamic RAM, etc.) for storage of instructions and data during program execution, and ROM (read-only memory) 524 on which fixed instructions and data can be stored. File storage subsystem 528 can provide persistent (i.e., non-volatile) storage for program and data files, and can include storage technologies such as solid-state drive and/or other types of storage media known in the art.

Management CPUs 508 can run a network operating system stored in storage subsystem 520. A network operating system is a specialized operating system for network device 500. For example, the network operating system can be the Arista EOS® operating system, which is a fully programmable and highly modular, Linux-based network operating system, developed and sold/licensed by Arista Networks, Inc. of Santa Clara, California. Other network operating systems may be used.

Bus subsystem 530 can provide a mechanism for the various components and subsystems of management module 502 to communicate with each other as intended. Although bus subsystem 530 is shown schematically as a single bus, alternative embodiments of the bus subsystem can utilize multiple buses.

The one or more I/O modules 506a-506p can be collectively referred to as the data plane of network device 500 (also referred to as data layer, forwarding plane, etc.). Interconnect 504 represents interconnections between modules in the control plane and modules in the data plane. Interconnect 504 can be a PCIe (Peripheral Component Interconnect Express) bus or any other suitable bus architecture (e.g., SMBus (System Management Bus), I²C (Inter-Integrated Circuit), etc.). I/O modules 506a-506p can include respective packet processing hardware comprising packet processors 512a-512p and memory hardware 514, to provide packet processing and forwarding capability. Each I/O module 506a-506p can be further configured to communicate over one or more ports 510a-510n on the front panel 510 to receive and forward network traffic. Packet processors 512a-512p can comprise hardware (circuitry), including for example, data processing hardware such as an ASIC (application specific integrated circuit), FPGA (field programmable array), processing unit, and the like. Memory hardware 514 can include lookup hardware, for example, content addressable memory such as TCAMs (ternary CAMs) and auxiliary memory such as SRAMs (static RAM). I/O modules 506a-506p can access memory hardware 514 via crossbar 518. It is noted that in other embodiments, the memory hardware 514 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Further Examples

Features described above as well as those claimed below may be combined in various ways without departing from the scope hereof. The following examples illustrate some possible, non-limiting combinations:

(A1) A method in a network device for importing and exporting routes between a source virtual routing and forwarding element (VRF) running on the network device and a target VRF running on the network device, the method comprising: obtaining a route from a routing table in the source VRF; matching contents of the obtained route with criteria in a filter, wherein the criteria in the filter match on attributes of routes contained in the routing table of the source VRF; in response to the contents of the obtained route matching at least some of the criteria in the filter: generating an intermediate route from the obtained route; modifying the intermediate route according to a set of editing instructions; and storing the modified intermediate route in a routing table in the target VRF; and repeating the foregoing for each route in the source VRF.

(A2) The method denoted as (A1), further comprising generating metadata from the obtained route, wherein modifying the intermediate route includes using the metadata.

(A3) For the method denoted as any of (A1) through (A2), the set of editing instructions includes storing criteria, wherein storing the modified intermediate route is conditional based on whether the modified intermediate route matches the storing criteria.

(A4) The method denoted as any of (A1) through (A3), further comprising receiving input from a user, the input comprising information that specifies the source and target VRFs, the filter, and the set of editing instructions.

(A5) For the method denoted as any of (A1) through (A4), the source VRF is a customer-facing VRF, wherein the target VRF is a core network-facing VRF.

(A6) For the method denoted as any of (A1) through (A5), routes in the source VRF are Unicast routes, wherein routes in the target VRF are virtual private network (VPN) routes and the intermediate route is a VPN path, wherein the set of editing instructions include instructions that match on VPN attributes in the intermediate route.

(A7) For the method denoted as any of (A1) through (A6), the target VRF comprises a plurality of routing tables, wherein the modified intermediate route is stored in one of the plurality of routing tables in the target VRF.

(A8) For the method denoted as any of (A1) through (A7), routes in the source VRF are VPN paths, wherein routes in the target VRF are Unicast routes and the intermediate route is a Unicast route, wherein the set of editing instructions include instructions that match on Unicast attributes in the intermediate route.

(A9) For the method denoted as any of (A1) through (A8), the obtained route is selected from one of a plurality of routing tables in the source VRF.

(B1) A network device comprising: one or more computer processors; and a computer-readable storage device comprising instructions for controlling the one or more computer processors to: access one or more routes from among a plurality of routes in a routing table of a source VRF according to a filter that matches on attributes in the plurality of routes; and for each accessed route generate and store an intermediate route in a routing table in a target VRF.

(B2) For the network device denoted as (B1), the source VRF is a customer-facing VRF and the plurality of routes are Unicast routes, wherein the filter matches on Unicast attributes in the Unicast routes, wherein the target VRF is a core network-facing VRF and the intermediate route is a VPN path, wherein the editing instructions include instructions that match on VPN attributes in the intermediate route.

(B3) For the network device denoted as any of (B1) through (B2), wherein the source VRF is a core network-facing VRF and the plurality of routes are VPN paths, wherein the filter matches on VPN attributes in the VPN paths, wherein the target VRF is a customer-facing VRF and the intermediate route is a Unicast route, wherein the editing instructions include instructions that match on Unicast attributes in the intermediate route.

(B4) For the network device denoted as any of (B1) through (B3), wherein the computer-readable storage device further comprises instructions for controlling the one or more computer processors to generate metadata from the obtained route, wherein the editing instructions includes instructions that use the metadata.

(C1) A method in a network device for exchanging routes between VRFs instantiated in the network device, the method comprising: accessing one or more routes from among a plurality of routes in a routing table of a source VRF according to a filter that matches on attributes in the plurality of routes; and for each accessed route generating and storing an intermediate route in a routing table in a target VRF.

(C2) The method denoted as (C1), further comprising generating the intermediate route from the accessed route; and modifying the intermediate route according to editing instructions.

(C3) For the method denoted as any of (C1) through (C2), the source VRF is a customer-facing VRF and the plurality of routes are Unicast routes, wherein the filter matches on Unicast attributes in the Unicast routes, wherein the target VRF is a core network-facing VRF and the intermediate route is a VPN path, wherein the editing instructions include instructions that match on VPN attributes in the intermediate route.

(C4) For the method denoted as any of (C1) through (C3), the source VRF is a core network-facing VRF and the plurality of routes are VPN paths, wherein the filter matches on VPN attributes in the VPN paths, wherein the target VRF is a customer-facing VRF and the intermediate route is a Unicast route, wherein the editing instructions include instructions that match on Unicast attributes in the intermediate route.

(C5) The method denoted as any of (C1) through (C4), further comprising generating metadata from the obtained route, wherein the editing instructions include instructions that use the metadata.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for importing and exporting routes between a source virtual routing and forwarding element (VRF) running on the network device and a target VRF running on the network device, the method comprising:

obtaining a route from a routing table in the source VRF;

matching contents of the obtained route with criteria in a filter, wherein the criteria in the filter match on attributes of routes contained in the routing table of the source VRF;

in response to the contents of the obtained route matching at least some of the criteria in the filter:

generating an intermediate route from the obtained route;

modifying the intermediate route according to a set of editing instructions; and storing the modified intermediate route in a routing table in the target VRF; and repeating the foregoing for each route in the source VRF, wherein when routes in the source VRF are Unicast routes:

routes in the target VRF are virtual private network (VPN) routes, the intermediate route is a VPN path, and the set of editing instructions include instructions that match on VPN attributes in the intermediate route, wherein when routes in the source VRF are VPN paths:

routes in the target VRF are Unicast routes, the intermediate route is a Unicast route, and the set of editing instructions include instructions that match on Unicast attributes in the intermediate route.

2. The method of claim 1, further comprising generating metadata from the obtained route, wherein modifying the intermediate route includes using the metadata.

3. The method of claim 1, wherein the set of editing instructions includes a storing criteria, wherein storing the modified intermediate route is conditional based on whether the modified intermediate route matches the storing criteria.

4. The method of claim 1, further comprising receiving input from a user, the input comprising information that specifies the source and target VRFs, the filter, and the set of editing instructions.

5. The method of claim 1, wherein when the routes in the source VRF are Unicast routes, the source VRF is a customer-facing VRF and the target VRF is a core network-facing VRF.

6. The method of claim 1, wherein the target VRF comprises a plurality of routing tables, wherein the modified intermediate route is stored in one of the plurality of routing tables in the target VRF.

7. The method of claim 1, wherein when the routes in the source VRF are VPN paths, the source VRF is a core network-facing VRF and the target VRF is a customer-facing VRF.

8. The method of claim 1, wherein the obtained route is selected from one of a plurality of routing tables in the source VRF.

9. A network device comprising:

one or more computer processors; and a computer-readable storage device comprising instructions for controlling the one or more computer processors to:

access one or more routes from among a plurality of routes in a routing table of a source VRF according to a filter that matches on attributes in the plurality of routes; and for each accessed route: generate an intermediate route, modify the intermediate route according to editing instructions, and store the modified intermediate route in a routing table in a target VRF, wherein the one or more routes are Unicast routes, wherein the filter matches on Unicast attributes in the Unicast routes, wherein the intermediate route is a VPN path, wherein the editing instructions include instructions that match on VPN attributes in the intermediate route.

10. The network device of claim 9, wherein the computer-readable storage device further comprises instructions for controlling the one or more computer processors to generate metadata from the obtained route, wherein the editing instructions includes instructions that use the metadata.

11. The network device of claim 9, wherein the source VRF is a customer-facing VRF and the target VRF is a core network-facing VRF.

12. A method in a network device for exchanging routes between VRFs instantiated in the network device, the method comprising:

accessing one or more routes from among a plurality of routes in a routing table of a source VRF according to a filter that matches on attributes in the plurality of routes; and for each accessed route: generating an intermediate route, modifying the intermediate route according to editing instructions, and storing the modified intermediate route in a routing table in a target VRF, wherein the one or more routes are VPN paths, wherein the filter matches on VPN attributes in the VPN paths, wherein the intermediate route is a Unicast route, wherein the editing instructions include instructions that match on Unicast attributes in the intermediate route.

13. The method of claim 12, further comprising generating metadata from the obtained route, wherein the editing instructions include instructions that use the metadata.

14. The method of claim 12, wherein the source VRF is a core network-facing VRF and the target VRF is a customer-facing VRF.

* * * * *